Dec. 24, 1935. G. JOHNSON 2,025,686
TURN OPERATED FASTENER AND INSTALLATION
Filed Oct. 3, 1932
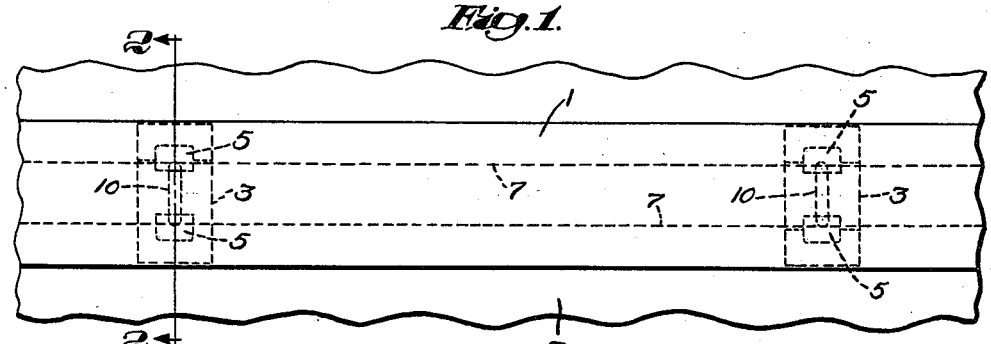
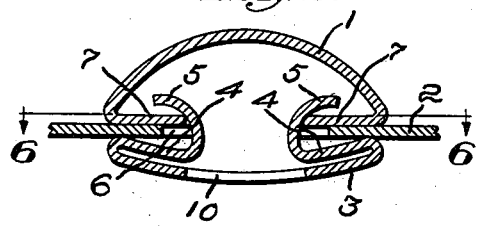
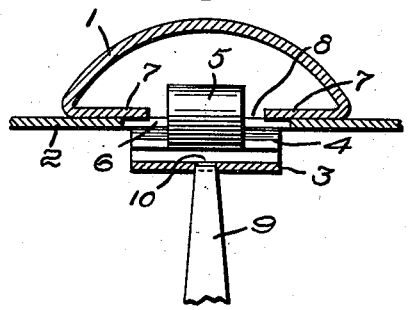
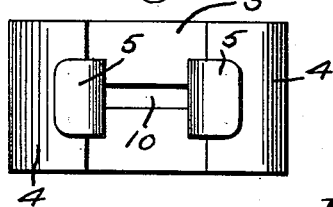
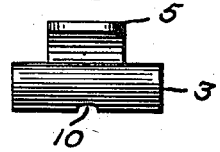
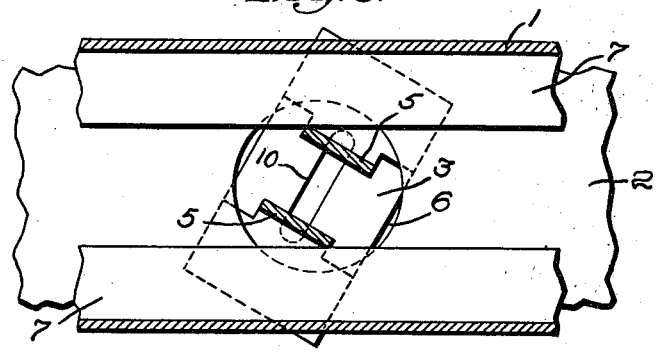
Inventor:
Gustav Johnson,
by Emery, Booth, Varney & Townsend
Attys Patented Dec. 24, 1935

2,025,686

UNITED STATES PATENT OFFICE 2,025,686

TURN OPERATED FASTENER AND INSTALLATION

Gustav Johnson, West Roxbury, Mass., assignor to United-Carr Fastener Corporation, Cambridge, Mass., a corporation of Massachusetts Application October 3, 1932, Serial No. 635,936

4 Claims. (Cl. 85—5)

My invention aims to provide improvements in fastener secured installations and fasteners of the turn operative type.

In the drawing which illustrates a preferred embodiment of my invention:—

Figure 1 is a plan view of a portion of an installation showing the manner of securing a molding in position by my improved fastening members;

Fig. 2 is an enlarged section taken on the line 2—2 of Figure 1 showing the fastener in locking position;

Fig. 3 is a section similar to that shown in Fig. 2, but showing the fastener turned to unlocking position;

Fig. 4 is an under side plan view of the fastener member;

Fig. 5 is an end view of the fastener member shown in the other figures; and

Fig. 6 is a section taken on the line 6—6 of Fig. 2 showing the relation of the hook portions of the yieldable fingers of the fastener to the edges with which they interlock prior to contraction of the hook portions.

My invention, as illustrated by the drawing, is particularly, though not exclusively, adapted for use in attaching moldings and the like to a sheet metal structure and includes a simple efficient one-piece sheet metal fastener for accomplishing the desired result. It should be understood that the fastening member is complete in and of itself and may be used to secure together two or more relatively thin apertured members without the use of additional screws or the like.

Referring to the specific embodiment of my invention illustrated by the drawing, I have shown a sheet metal fastener constructed from a single piece of metal and used to secure a hollow molding strip 1 to a thin sheet metal structure 2.

The fastening member is formed from a flat strip of metal and comprises a body portion 3 and a pair of yieldable fingers 4 having hook-like portions 5. The hook-like portions extend inwardly toward each other from opposite edges of the body portion 3 and then curved outwardly and away from the body portion, as best illustrated in Fig. 2. In the specific construction illustrated the hook portions 5—5 are made somewhat more narrow than those portions of the fingers 4 which extend inwardly from the opposite edges of the body portion 3, as shown in Figs. 4 and 5. By this construction the fingers can enter a relatively small aperture 6 in the structure 2 and readily engage the inwardly turned flange portions 7—7 of the molding 1, while at the same time providing relatively wide bearing surfaces for engagement with the face of the structure 2. It should be noted that the hook portions of the fingers present straight surfaces crosswise for substantial engagement with the straight surfaces provided by the inner edges of the flanges 7—7 of the molding 1 for the purposes hereinafter described.

The aperture 6 may be round or any other desirable shape, so long as it will permit the hook portions 5—5 to pass therethrough when the fastener is in the position shown in Fig. 3.

Assuming that the parts desired to be secured together are as shown in the drawing the fastener may be attached by entering the hook portions 5—5 through the aperture 6 and the space 8 between the inner edges of the flanges 7—7 and rotated. Rotation is preferably accomplished by the use of a tool such, for instance, as a screw driver, the under portion 9 of which is shown in Fig. 3. The portion 9 of the screw driver fits into a tool-receiving slot 10 formed lengthwise of the body portion 3 of the fastener. Upon rotation of the fastener from a position shown in Fig. 3 to a position shown in Fig. 2 the corners (Fig. 6) will first engage the edges of the flanges 7—7. Thereafter the hook portions must be forced toward each other to overcome the difference in the distance between the corners of the opposed hook portions and the distance between the edges of the flanges 7—7 so that the fastener may be turned into a position shown in Figs. 1 and 2. Thus, there is provided a sort of a snap action so that when the fastener is turned to its ultimate locking position the straight faces of the hook portions will engage the straight faces of the inner edges of the flanges 7—7. It will, of course, be understood by those skilled in the art that such engagement, plus a certain amount of tension supplied by the formation of the fingers and hook portions thereof, will securely hold the fastener in locking position so that it cannot acidentally be turned to the unlocking position, as shown in Fig. 3.

It will be noted that I have shown the body portion 3 as being somewhat curved longitudinally and that the inwardly extending portions of the fingers 4 normally parallel the curvature of the body portion 3. This construction permits relative yielding of the fingers toward and away from the base portion. For instance, an observation of Fig. 2 will clearly show that the fingers 4 may yield both throughout their lengths and adjacent to their connections with the body portion 3 to compensate for variations in thickness of the flange 7 and the structure 2. If, for instance, the overall thickness of the two parts to be secured together were increased by say one-half of that shown in Fig. 2 the fingers would yield away from the body portion 3 and toward the structure 2. With this construction I can manufacture my simple fastening devices for securing together two members of minimum thickness and use the same fastening members to secure together other members of substantially increased thickness.

The fastening members are constructed in such a manner that they are exceedingly durable and are sufficiently stiff in action so that it requires considerable turning power to move the fastener into either locking or unlocking position. As a result the members 1 and 2 are held tightly against one another so that they cannot shift without exerting considerable force on one part or the other. Furthermore, there is a definite snap action which takes place during the rotation of the fastener relative to the parts to be secured together both in the locking and the unlocking movements so that the operator can know exactly when the fastener is in either locked or unlocked position.

While I have illustrated and described a preferred embodiment of my invention, I do not wish to be limited thereby, because the scope of my invention is best defined by the following claims.

I claim:—

1. The combination with a pair of relatively thin superposed apertured members of a fastener member of the rotary engagement type adapted to be engaged with and entirely disengaged from said apertured members, one of said apertured members having an elongated aperture having straight wall portions along the long sides thereof, and said fastener member having opposed yieldable fingers extending from a body portion seated against one of said apertured members and shaped and arranged to have outwardly flaring ends which, acting together, form an elongated end adapted to pass through the elongated aperture when in a predetermined relation only and after passing through the apertures of both members turned into engagement with the straight wall portions of the elongated apertured part and with the outwardly flaring ends overlying portions of the part having the elongated aperture, said fingers being curved lengthwise to act as cam means abutting said side wall portions to hold apertured members of various thicknesses tightly together and being straight crosswise to make interlocking engagement with said straight walled portions.

2. The combination with a pair of relatively thin superposed apertured members of a fastener member of the rotary engagement type adapted to be engaged with and entirely disengaged from said apertured members, one of said apertured members having an elongated aperture having straight wall portions along the long sides thereof, and said fastener member having opposed yieldable fingers extending from a body portion seated against one of said apertured member and shaped and arranged to have outwardly flaring ends which, acting together, form an elongated end adapted to pass through the elongated aperture when in a predetermined relation only and after passing through the apertures of both members turned into engagement with the straight wall portions of the elongated apertured part and with the outwardly flaring ends overlying portions of the part having the elongated aperture, said fingers being curved lengthwise to act as cam means abutting said side wall portions to hold apertured members of various thicknesses tightly together and being straight crosswise to make interlocking engagement with said straight walled portions and tool-receiving means presented by said body portion for reception of a tool for rotating said fingers into and out of engagement with said straight wall portions.

3. A fastener member of the turn-engaging type for connecting a plurality of apertured members together, comprising a single piece of sheet metal bent to provide a body portion and yieldable finger-engaging portions connected to opposed sides of and located entirely beneath said body in substantially parallel spaced relation thereto, said engaging portions having their free end portions curved downwardly and outwardly, presenting outwardly flaring opposed arcuate hooks, the outer faces of which progress outwardly from each other toward the connected sides of said body, whereby to provide opposed flat yieldable cam portions adapted frictionally to engage the walls of apertured members of varying thickness, and a tool receiving aperture in said body portion for reception of a tool by means of which the fastener may be turned.

4. A fastener of the turn-engaging type for connecting a plurality of apertured members together comprising a piece of sheet metal shaped to provide a convexed body portion and yieldable finger-engaging portions connected at opposed points to said body portion and located entirely beneath and adjacent the concave side of said body in substantially parallel spaced relation thereto, said opposed finger-engaging portions having their free ends downwardly and outwardly and progressisely curved toward the connected sides thereof to provide hooks, the axis of curvature of which lies adjacent the plane of said finger portions, thereby providing opposed outwardly flaring flat cam portions adapted to engage the walls of one of the apertured members, the edges of said convex body portion being adapted to bear upon the outer surface of the other of the said apertured members.

GUSTAV JOHNSON.